Sept. 14, 1965    C. D. CRICKMER    3,205,736
DIE ELEMENT FOR PIPE TONGS
Filed Nov. 20, 1963    2 Sheets-Sheet 1
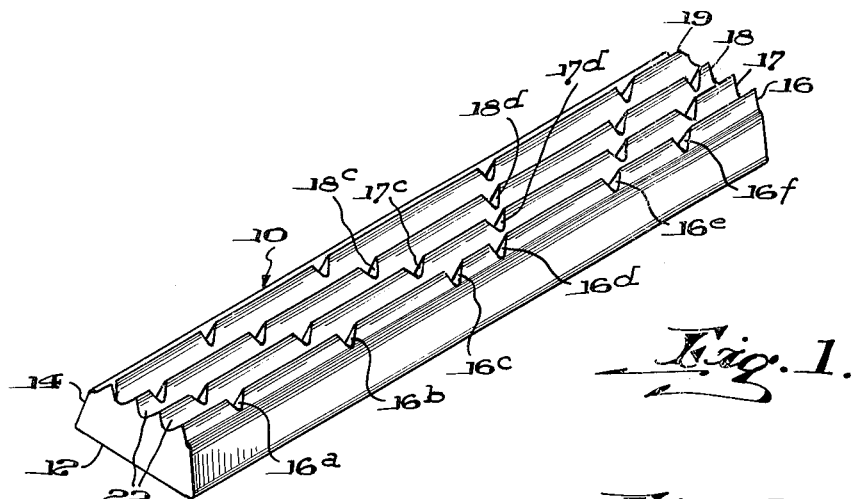
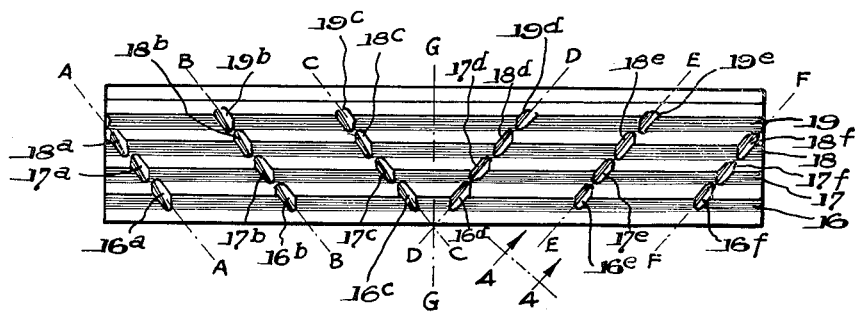
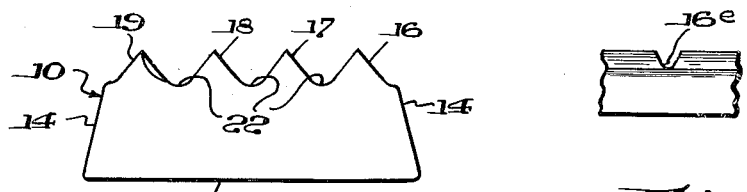
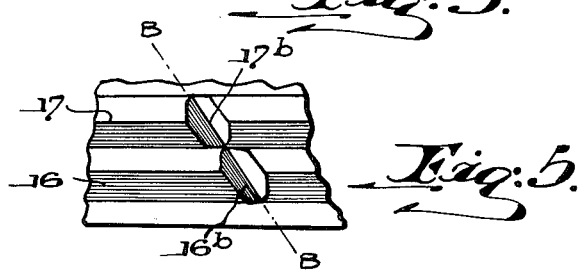
INVENTOR.
CHARLES D. CRICKMER.
BY
E. Wallace Breisch
his ATTORNEY.

Sept. 14, 1965 C. D. CRICKMER 3,205,736
DIE ELEMENT FOR PIPE TONGS
Filed Nov. 20, 1963 2 Sheets-Sheet 2
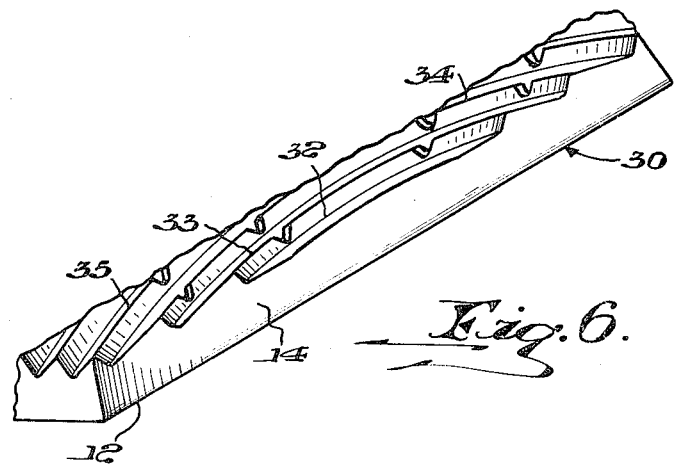
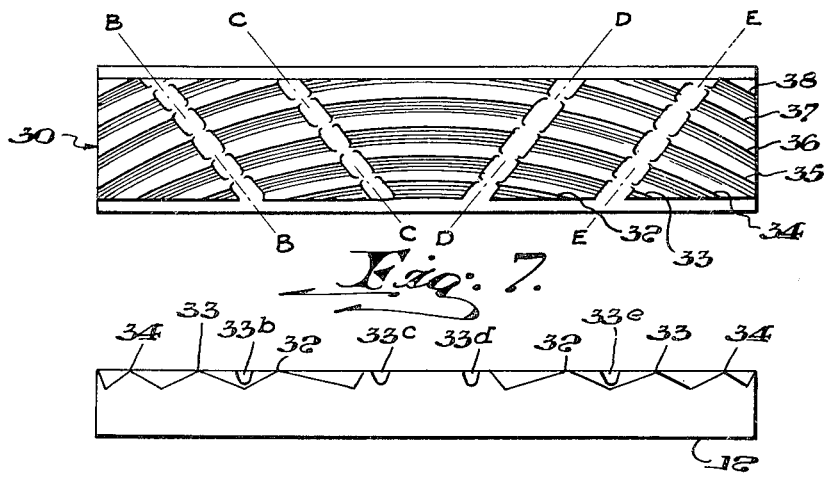
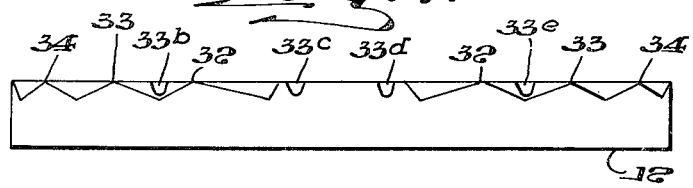
INVENTOR.
CHARLES D. CRICKMER.
BY
E. Wallace Breisch
his ATTORNEY.

United States Patent Office 3,205,736
Patented Sept. 14, 1965

3,205,736
DIE ELEMENT FOR PIPE TONGS
Charles D. Crickmer, Houston, Tex., assignor to Joy Manufacturing Company, Pittsburgh, Pa., a corporation of Pennsylvania
Filed Nov. 20, 1963, Ser. No. 324,987
3 Claims. (Cl. 81—186)

This invention relates to dies in gripping tools and more particularly, is directed to improvements of the die element in tools of the type generally known as pipe tongs, such as are utilized in the oil and gas industries.

Elongated rectangular dies such as those of the present invention are well known in the prior art and are used in a tong similar to that shown in U.S. Patent No. 2,962,919 for gripping a pipe having an axis parallel to the longitudinal dimension of the die and normal to the face of the tong. Some of the dies of the prior art have die teeth formed generally longitudinally of the die and parallel to the axis of the pipe and arranged to be on a 90° angle to the direction of loading as are those of the present invention. Such teeth are useful in that they maximize longitudinal tooth contact with the pipe but are not satisfactory under all conditions of service for the following reasons: (1) each such tooth is very long and has only two sharp corners to dig into the pipe resulting in poor penetration during the initial part of the gripping action; (2) pairs of such long teeth often trap mud or cuttings from the pipe or other foreign material therebetween with no possible escape for the foreign material except at the ends of the teeth; (3) such teeth having only one upwardly facing surface and one downwardly facing surface per tooth have very poor longitudinal stability with relation to the pipe.

The solution to these problems according to the present invention is found in the provision of notches or cross cuts in the teeth which provide an exit path for mud or other foreign material trapped between the teeth, and also provide a number of sharp corners per tooth to give better initial penetration into the pipe. These notches also provide a plurality of upwardly facing and downwardly facing surfaces to give the tong superior longitudinal stability with relation to the pipe.

If the notches in the various teeth were aligned in the direction of loading, that is in planes normal to the axis of the pipe, slipping of the dies on the pipe during wrenching would result in the formation of undesirable ridges partially encircing the pipe. To avoid the formation of ridges, the notches or cross cuts of the present invention are aligned on centerlines forming acute angles with the direction of loading. If all of the notches were aligned on the same angle there would be a tendency for the tong to screw up or down the pipe according to the direction of the angle formed by the notches in the various teeth. The present invention provides such notches disposed at an acute angle to the direction of loading but so arranged that one-half of the notches are disposed at an acute angle to the direction of loading trending upwardly away from the direction of loading while the other half of the notches are disposed at substantially the same angle but in a direction trending downwardly away from the direction of loading. Thus the notches in the teeth of the die of the present invention provide good initial penetration, furnish an exit path for mud or other foreign material and provide longitudinal stability for the tong with respect to the pipe without any tendency to form undesirable ridges on the pipe.

It is therefore an object of this invention to provide a new and improved tong die.

Another object of this invention is to provide a new and improved tong die which when mounted in a pipe tong provides the tong with good longitudinal stability with relation to the pipe.

It is a further object of this invention to provide a new and improved tong die having longitudinal teeth with cross cuts to provide exit paths for mud or other foreign material trapped between such teeth.

It is still another object of this invention to provide a new and improved tong die having longitudinal teeth with cross cuts therein so arranged as to provide, when mounted in a pipe tong and engaged with a pipe, good initial penetration into the pipe, prevent longitudinal motion of the tong with respect to the pipe and at the same time prevent the formation of ridges encircling the pipe in the direction of loading should slippage occur between the pipe and the die.

These and other objects and advantages of the tong die of this invention will become more apparent upon consideration of the following description and drawings in which:

FIGURE 1 is a substantially full scale perspective view of a tong die constructed according to the principles of this invention;

FIGURE 2 is a top plan view of the tong die of FIGURE 1 on a reduced scale;

FIGURE 3 is an enlarged end elevational view of the tong die of FIGURE 1;

FIGURE 4 is a fragmentary sectional view taken substantially on line 4—4 of FIGURE 2;

FIGURE 5 is a fragmentary view of a portion of FIGURE 2 on an enlarged scale;

FIGURE 6 is a fragmentary perspective view similar to FIGURE 1, showing a second embodiment of the tong die of this invention;

FIGURE 7 is a top plan view on a reduced scale, of the tong die of FIGURE 6;

FIGURE 8 is a front elevational view of the tong die of FIGURES 6 and 7 on the same scale as FIGURE 7.

In FIGURE 1 there is shown an elongated generally rectangular tong die 10 having a flat bottom surface 12 and flat longitudinal side surfaces 14 extending upwardly from the bottom surface 12 and sloping slightly inwardly to form with the bottom surface 12 a dovetail shape commonly employed to mate with a similar shape formed in the inner surface of the jaws of a tong (such as that shown in U.S. Patent 2,962,919) for the purpose of securing the die in the tong jaw.

The top surface of the die 10 is formed into a plurality of elongated, longitudinally extending, sharp edged teeth 16, 17, 18 and 19 alternating with a series of round bottom grooves 22 respectively. The crests (or apexes) of the teeth 16–19 are sharp edges parallel to each other and as shown are parallel to the planes of the surfaces 14 and as used in a tong are normal to the loading direction and parallel to the axis of a pipe with which the tong is engaged, giving maximum longitudinal tooth contact with the pipe.

Each tooth 16–19 is provided with a plurality of round bottom notches such as 16e (see FIG. 4) having flanks converging downwardly from the apex of the respective tooth to an upwardly concave surface upwardly adjacent the bottom of the respective grooves 22 on either side of such tooth. These notches indicated as notches 16a, 16b, 16c, 16d, 16e and 16f on tooth 16 and similarly designated as 17a, 17b, 17c, 17d, 17e and 17f, 18a, 18b, 18c, 18d, 18e, 18f, 19b, 19c, 19d and 19e notches of the teeth 17, 18 and 19 respectively, are longitudinally spaced along the respective teeth, it being noted that the a and f notches are missing from the tooth 19. As best seen in FIGURE 2, all of the notches bearing a given letter designation are aligned with each other as for instance the notches 16c, 17c, 18c, and 19c have a common centerline C—C forming an angle of approximately 45° with the lateral centerline G—G of the die 10, line C—C trending upwardly and to the left as seen in FIGURE 2. The notches 16d, 17d, 18d and 19d have a common centerline D—D forming an angle of apprximately 45° with the lateral centerline G—G, but in this case the line D—D trends upwardly and to the right as viewed in FIGURE 2. The notches 16c and 16d are approximately equi-distant from the centerline G—G. In like manner the notches 16b, 17b, 18b and 19b have a common centerline B—B parallel to line C—C and the notches 16a through 18a have a common centerline A—A parallel to line C—C, while the notches 16e, 17e, 18e and 19e and the notches 16f, 17f and 18f have common centerlines E—E and F—F, respectively, which are parallel to the line D—D. Centerlines C—C, B—B, and A—A are spaced at substantially equal distances along the die 10 to the left of the lateral centerline G—G, while centerlines D—D, E—E and F—F, approximately normal to centerlines A—A, B—B and C—C, are spaced at substantially equal intervals to the right of centerline G—G as viewed in FIGURE 2.

Although the centerlines A—A, B—B and C—C are parallel as shown, such parallelism is not a necessary feature of this invention, since the advantages resident therein can be obtained without having any of such centerlines parallel to each other.

When using the die of this invention a plurality of the dies 10 are mounted in the arcuate inwardly facing jaws of a pipe tong which is then engaged with the outer surface of the pipe in such manner as to engage at least two of the teeth of each die with the outer surface of the pipe, the teeth being parallel to the axis of the pipe. A radially inward engagement force normal to the axis of the pipe is applied by the configuration and mechanical arrangement of the pipe tong simultaneously with the application of a working force which is a rotative effort applied tangent to the surface of the pipe and consequently normal to the radius of the pipe extending from its axis to a respective tooth. At the beginning of the clamping action the presence of the notches improves the penetration of the teeth into the surface of the pipe because of the presence of a plurality of sharp corners on the respective teeth and also because of a slight reduction in the amount of surface engaged by the teeth. Mud, particles of rust and other foreign material are provided with an exit path through the notches such as 16e in case enough foreign material is present to fill some of the grooves between the teeth. When rotative force is applied to turn the pipe, slippage may occur between the teeth and the surface of the pipe with the result that a portion of the surface is planed down or removed by the teeth 16, 17, 18, or 19 of the die 10. For example in a common case the teeth 17 and 18 will be engaged with the surface of the pipe and when slippage occurs a small portion of the surface of the pipe will be removed by the tooth 17 and ridges will be left upon the surface of the pipe by the absence of planning action at the notches such as 17c and 17d, but when further slippage occurs these raised portions or ridges will be removed by the solid portion of the tooth 18 between the notches 18c and 18d as it passes over the same portion of the pipe. When the teeth 17 and 18 are engaged with and penetrating somewhat into the surface of the pipe, the sloping sides of the notches 17a, 17b, 17c, 17d, 17e, 18a, 18b, 18c, 18d, 18e and 18f will be engaged with mating surfaces developed in the material of the pipe by penetration of the teeth 17 and 18 and since these surfaces are disposed at a substantial angle with respect to the axis of the pipe such surfaces will act to prevent longitudinal motion of the tong with respect to the pipe.

FIGURES 6, 7 and 8 illustrate a tong die 30 constructed according to the principles of this invention which is entirely similar to the tong die 10 above described excepting only that elongated arcuate teeth 32, 33, 34, 35, 36, 37 and 38 replace the elongated straight teeth 16, 17, 18, 19 of the tong die 10. Round bottom notches for instance 33b, 33c, 33d, 33e (see FIGURE 8) similar to the notches 16b, 16c, 16d and 16e of tong die 10 are formed in the teeth 32, 33, 34, 35, 36, 37 and 38 and are aligned on the lines B—B, C—C, D—D, E—E as formerly described. The advantages resident in the tong die 30 of FIGURES 6, 7 and 8 over the tong die 10 reside almost entirely in the fact that such arcuate teeth can be formed by the application of rotational motion to forming and finishing tools rather than the straight line motion necessary in forming and finishing the tong die 10. Operation of the tong die 30 being the same as that for tong die 10 an operation description is felt to be unnecessary.

It is to be realized that preferred embodiments of the principles of this invention have been presented and that the principles of this invention are embodied in the provision of notches in the teeth of the die, which notches are arranged so that no two notches are aligned in a plane normal to the longitudinal axis of the die 10 and that sets of such notches are aligned along centerlines having preferably but not necessarily opposite equal angles with respect to the lateral centerlines of the die.

It is to be appreciated that, although four teeth and six lines of notches have been shown and described for the tong die 10, a greater or lesser number of teeth or a different number of notches are encompassed within the scope of this invention.

It is further to be realized that, although particular embodiments of this invention have been described, other embodiments of the principles of this invention such as zigzag or staggered placement of the notches are possible and envisioned and it is respectively requested that this invention be interpreted as broadly as possible and be limited only by the prior art.

I claim:
1. A gripping tool die comprising: an elongated body structure having a working face, a plurality of tooth elements extending at least generally longitudinally of said working face and forming groove portions therebetween, each tooth element of said tooth elements extending outwardly from said face to form an apex, a plurality of notches extending inwardly from the apex of at least a majority of said tooth elements respectively, said notches forming sets of notches wherein each notch of any one set is in a tooth other than the tooth in which another notch of said one set is formed, the notches of each of said sets of notches having common centerlines respectively, said common centerline of any one set being parallel to said common centerlines of a first group of said sets of notches and convergent with said common centerlines of a second group of said sets of notches, and all of said common centerlines being laterally spaced from each other and spaced longitudinally throughout said body structure so that not more than one pair thereof intersect within the outline of said body structure.

2. A gripping tool die comprising: an elongated body structure having a working face, a plurality of tooth elements extending at least generally longitudinally of said working face and forming groove portions therebetween, each tooth element of said tooth elements extending outwardly from said face to form an apex, a plurality of notches extending inwardly from the apex of each of said tooth elements respectively, said notches forming sets of notches wherein each notch of any one set is in a tooth other than the tooth in which another notch of said one set is formed, the notches of each of said sets of notches having common centerlines respectively, said common centerline of any one set being parallel to said common centerlines of a first group of said sets of notches and convergent with said common centerlines of a second group of said sets of notches, said common centerlines of said first group forming equal corresponding angles with the transverse centerline of said working face from one side of said transverse centerline and the said common centerlines of said second group forming equal corresponding angles with said transverse centerline from the side opposite said one side of said transverse centerline, and all of said common centerlines being laterally spaced from each other and spaced longitudinally throughout said body structure so that not more than one pair thereof intersect within the outline of said body structure.

3. A gripping tool die comprising: an elongated body structure having a working face, a plurality of tooth elements extending at least generally longitudinally of said working face and forming groove portions therebetween, each tooth element of said tooth elements extending outwardly from said face to form an apex, a plurality of notches extending inwardly from the apex of each of said tooth elements respectively, said notches forming sets of notches wherein each notch of any one set is in a tooth other than the tooth in which another notch of said one set is formed, the notches of each of said sets of notches having common centerlines respectively, said common centerline of said one set being parallel to said common centerlines of a first group of said sets of notches and convergent with said common centerlines of a second group of said sets of notches, said common centerlines of said first group forming equal corresponding angles with the transverse centerline of said working face from one side of said transverse centerline and the said common centerlines of said second group forming equal corresponding angles with said transverse centerline from the side opposite said one side of said transverse centerline, said first group and said second group each including substantially one-half of said plurality of notches, respectively, and all of said common centerlines being laterally spaced from each other and spaced longitudinally throughout said body structure so that not more than one pair thereof intersect within the outline of said body structure.

References Cited by the Examiner

UNITED STATES PATENTS

| | | | |
|---|---|---|---|
| 2,609,720 | 9/52 | Barnard | 81—186 |
| 2,720,128 | 10/55 | Woolley. | |
| 2,873,636 | 2/59 | Sherman | 81—186 X |
| 2,962,919 | 12/60 | Grundmann et al. | 81—186 |

WILLIAM FELDMAN, *Primary Examiner.*

MILTON S. MEHR, *Examiner.*